United States Patent
Sapojnik et al.

(10) Patent No.: US 11,301,161 B2
(45) Date of Patent: Apr. 12, 2022

(54) RECOMMENDATION SYSTEM FOR REPLICATION POLICIES

(71) Applicant: EMC IP Holding Company LLC, Hopkinton, MA (US)

(72) Inventors: Arik Sapojnik, Beer Sheva (IL); Amihai Savir, Sansana (IL); Anat Parush Tzur, Beer Sheva (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 35 days.

(21) Appl. No.: 17/023,857

(22) Filed: Sep. 17, 2020

(65) Prior Publication Data

US 2022/0083226 A1 Mar. 17, 2022

(51) Int. Cl.
*G06F 3/06* (2006.01)
*G06F 9/455* (2018.01)

(52) U.S. Cl.
CPC ............. *G06F 3/065* (2013.01); *G06F 3/067* (2013.01); *G06F 3/0619* (2013.01); *G06F 3/0631* (2013.01); *G06F 3/0664* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 10,417,099 B1* | 9/2019 | Yadav | G06F 9/45558 |
| 2011/0251992 A1* | 10/2011 | Bethlehem | H04L 67/306 707/610 |
| 2014/0082165 A1* | 3/2014 | Marr | G06F 9/5044 709/222 |
| 2014/0258446 A1* | 9/2014 | Bursell | H04L 67/303 709/217 |
| 2015/0150087 A1* | 5/2015 | Palshikar | H04L 63/20 726/3 |
| 2016/0057041 A1* | 2/2016 | Gupta | H04L 41/5025 706/12 |
| 2018/0276050 A1* | 9/2018 | Gong | G06N 20/00 |
| 2020/0201981 A1* | 6/2020 | Wardman | G06F 21/44 |
| 2021/0117216 A1* | 4/2021 | Savir | G06F 9/5072 |

OTHER PUBLICATIONS

Chavan et al. (Clustered Virtual Machines for Higher Availability of Resources with Improved Scalability in Cloud Computing). IEEE ISBN: 978-1-4799-3486-7/14, pp. 221-225 (Year: 2014).*

* cited by examiner

*Primary Examiner* — Kaushikkumar M Patel
(74) *Attorney, Agent, or Firm* — Workman Nydegger

(57) ABSTRACT

One example method includes generating a policy recommendation that can be implemented in data protection systems. The generation of the policy is based on information garnered from multiple distinct users. Initially, the users are clustered based on their user profiles. The virtual machines operated by these users are then clustered based on virtual machine profiles. This allows, for each resulting cluster, policy recommendations to be made based on a policy distribution of the corresponding cluster.

20 Claims, 7 Drawing Sheets

RECOMMENDATION SYSTEM FOR REPLICATION POLICIES

FIELD OF THE INVENTION

Embodiments of the present invention generally relate to data protection and data protection operations. More particularly, at least some embodiments of the invention relate to systems, hardware, software, computer-readable media, and methods for generating data protection policy recommendations.

BACKGROUND

Most organizations rely on computing systems and data for operational purposes. Consequently, these same organizations implement some type of data protection because the loss of data could be catastrophic. Although data protection is important, data protection is not solely driven by the need to protect data. Many organizations, for example, are subject to governmental regulations or other restrictions that impact the manner in which data is protected. These regulations or restrictions may specify that an organization perform certain data protection operations.

Consider, for example, organizations that have large numbers of virtual machines (VMs). Because working environments in these systems are dynamic and rapidly change over time, the needs of the organization also change dynamically and rapidly. Attempting to adapt to the changes manually is inadvisable because the process is complicated and error prone. From a practical standpoint, manually configuring policies for hundreds or even thousands of virtual machines is not possible at least because the management tasks associated with these virtual machines (e.g., definition of consistency groups, assignment of replication, etc.) are complicated.

For example, when a data protection policy is being assigned to virtual machine, a consistency group, or the like, the usage of the virtual machine, the purpose of the virtual machine, and the regulator rules that apply to the virtual machine should be considered. As previously stated, these aspects of data protection are difficult to discern and change over time. In addition, the ability to determine a suitable policy is subject to the subjective view of the system administrator, the administrator's understanding of regulations and hardware, and the like. Unsurprisingly, an unsuitable or insufficient policy may be assigned.

In addition, organizations may not even realize that their data protection policies should be updated. Changes in regulations, best practices, or the like, for example, may not be known to the system administrator. Even if an update is made manually, there is no assurance on how the system will respond to the upgrade, particularly since the components in the system often share the same resources.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection and data protection processes. More particularly, at least some embodiments of the invention relate to systems, hardware, software, computer-readable media, and methods for data protection and data protection operations including, by way of example, backup operations, replication operations, recovery operations, policy operations including data protection policy recommendation operations, and the like. Embodiments of the invention may be implemented in, by way of example only, data protection systems such as Dell RecoverPoint.

Data protection systems are used by multiple entities including organizations, businesses, individuals. Some entities may have multiple data protection systems (or multiple instances of the data protection system) that operate at different sites. In one example, the data protection system may provide data protection including continuous data protection. This allows data to be recovered to any point in time (PiT). The data protection system may also replicate data over various distances to replication sites. A data protection system (e.g., Dell RecoverPoint) may also be associated with a control center (e.g., RecoverPoint Center (RPC)).

Figure 1:
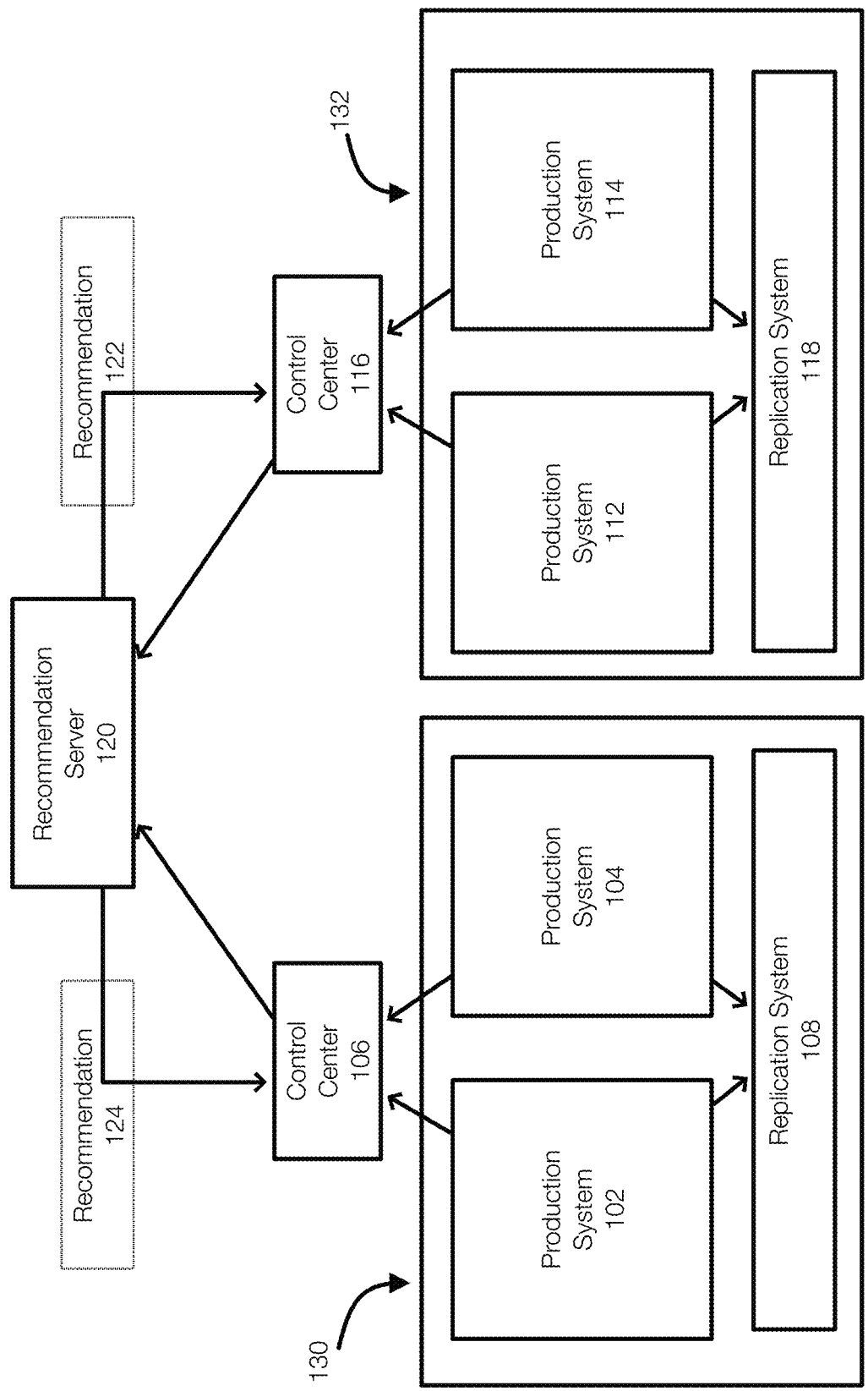
FIG. 1 discloses aspects of computing systems that implement data protection policies and discloses aspects of a data protection system configured to generate policy recommendations.

FIG. 1 illustrates an example of a computing environment in which data protection operations including replication or policy recommendation operations are performed. FIG. 1 illustrates computing systems 130 and 132 of two different and unrelated organizations. These computing systems 130 and 132 each implement a data protection system (e.g., RecoverPoint), represented, respectfully, as replication systems 108 and 118.

Although the computing systems 130 and 132 are associated with different organizations, embodiments of the invention leverage data from multiple installations in order to generate policy recommendations. Thus, the policy recommendations generated for a particular organization may be based on data associated with other organizations. The ability to generate policy recommendations using data (or metadata) from multiple data protection system installations does not place the data of an organization at risk of being compromised or inadvertently exposed.

In addition, policy recommendations can also be generated based on data generated by or collected from multiple installations within the same organizations and/or data generated or collected from installations at unrelated organizations.

The computing system 130 may include one or more production systems, such as production systems 102 and 104. The system 132 similarly includes production systems 112 and 114. Each of the production systems may be associated with a separate instance or install of a data protection operation. Alternatively, the production systems may be associated with a distributed installation or a single installation of a data protection system. Regardless of the installation details, embodiments of the invention are able to generate policy recommendations for the computing systems 130 and 132.

The replication system 108 is configured to perform replicate operations (and/or perform other data protection operations). In one example, the replication system 108 replicates the applications, data, virtual machines, etc., of the production systems 102 and 104 to a replication site. Both the production systems 102 and 104 and the replication sites may be distributed and located in different regions, clouds, datacenters, or the like. Similarly, the replication system 118 replicates the production systems 112 and 114.

In one example, the production systems 102, 104, 112, and 114 may each be associated with or include virtual machines. The control center 106 may be associated with the organization or system 130 and the control center 116 may be associated with the organization or system 132.

The control center 106 (and 108) may provide a user interface that allows the data protection or replication systems 108 to be mapped, accessed, configured, or otherwise controlled. The control centers 106 and 116 may also have the ability to communicate with a recommendation server 120 or, more generally, a provider server. The recommendation server 120 is configured to collect data from multiple users and generate policy recommendations from the collected data.

The control center 106 can provide an organization with a holistic view of the replication system 108 individually and/or collectively when there is more than one instance of the replication system. The recommendation server 120 may be configured to use the data generated by the systems 130 and 132 to generate policy recommendations for their respective replication policies.

More specifically, the replication system 108 may be associated with a first organization and the replication system 118 may be associated with a second organization. There may be multiple such systems. The recommendation server 120 may use the data generated by these systems 130 and 132 or more specifically generated by the operation of the replication systems 108 and 118 to generate policy recommendations.

Thus, the recommendation server 120 may provide a recommendation 124 for the system 130 and a recommendation 122 for the system 132. The recommendations can be generated automatically and proactively. Advantageously, embodiments of the system, by proactively generating recommendation policies, can help the organizations ensure that their replication policies are efficient, comply with relevant regulations, and the like. This allows the data generated by all organizations collectively to benefit each other.

Figure 2:
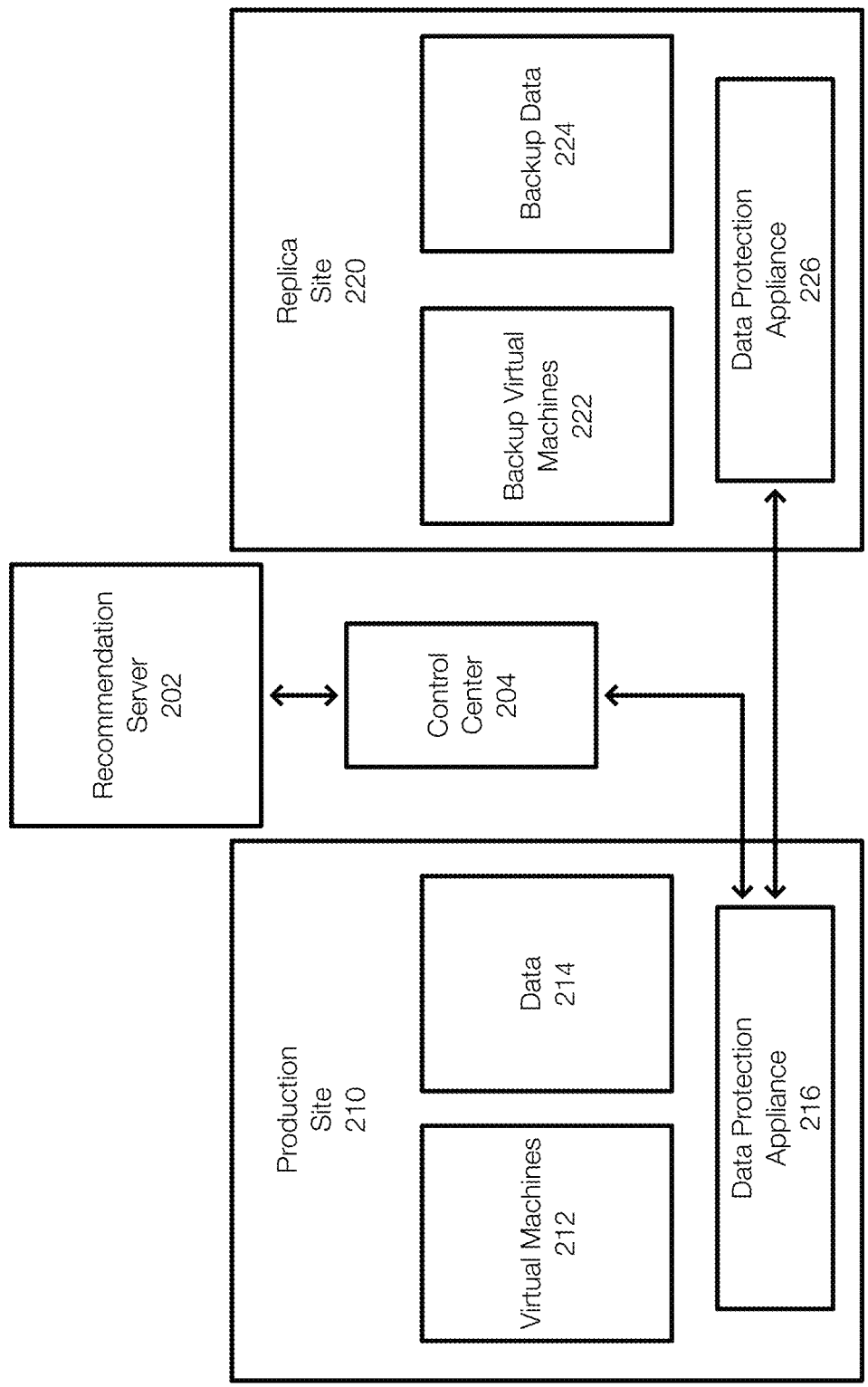
FIG. 2 discloses aspects a data protection system configured to generate policy recommendations.

FIG. 2 illustrates an example of a data protection system for a specific organization. FIG. 2 illustrates a production site 210 (the organization may have multiple sites). The production site 210 may include virtual machines 212 and data 214. The data protection appliance 216 (e.g., a data protection system) may replicate the virtual machines 212 and/or data 214 to a replica site 220. The replica site 220 may also include a data protection appliance 226, which is also a part of the data protection system. The production site 210 is thus backed up as backup virtual machines 222 and backup data 224. The replication operation may allow for continuous replication, any PiT recovery, failover operations, and the like.

The data protection appliance 216 is an example of a data protection system such as the replication system illustrated in FIG. 1. The data protection appliance 216, which may be virtual or physical and which may include multiple components, is associated with a control center 204, which is an example of the control center 106. The control center 204 monitor the data protection appliance 216 (or more generally all data protection systems of the organization) and is configured to collect information related to the data protection appliance 216 and related to use of the data protection appliance 216 and related to the use of the control center 204 itself. For example, the control center 216 may collect information such as warnings, errors, journal sizes, amount and sizes of protected virtual machines, usage of the control center including user interface usage, API (Application programming interface) usage and the like.

The control center 204 can call home or communicate with the recommendation server 202 (which may be affiliated with a provider of the data protection systems implemented by the organization). The recommendation server 202 can collect information from multiple users (e.g., customers), and may implement machine learning or artificial intelligence to generate data protection policy recommendations. The recommendation server 202 may also implement clustering techniques on the collected data to generate policy distributions. These distributions can identify outliers and policies can be recommended to the outliers.

The recommendation server 202, for example, helps a customer detect a data protection policy that is not in place, recommend a data protection policy based at least in part on other users/customers, identify incorrect or unsuitable data protection policies, and the like or combination thereof.

The control center 204 of a user may rely on the user's environment as a whole in addition to static information regarding the organization and/or the current virtual machine. The recommendation server 202, by collecting information from multiple customers through their respective control centers, can apply crowdsourcing techniques to determine commonly used data protection policies, identify trends in policy changes, discover outliers, and the like. This further allows the recommendation server 202 to generate tailored recommendations in an automatic and proactive manner.

Figure 3:
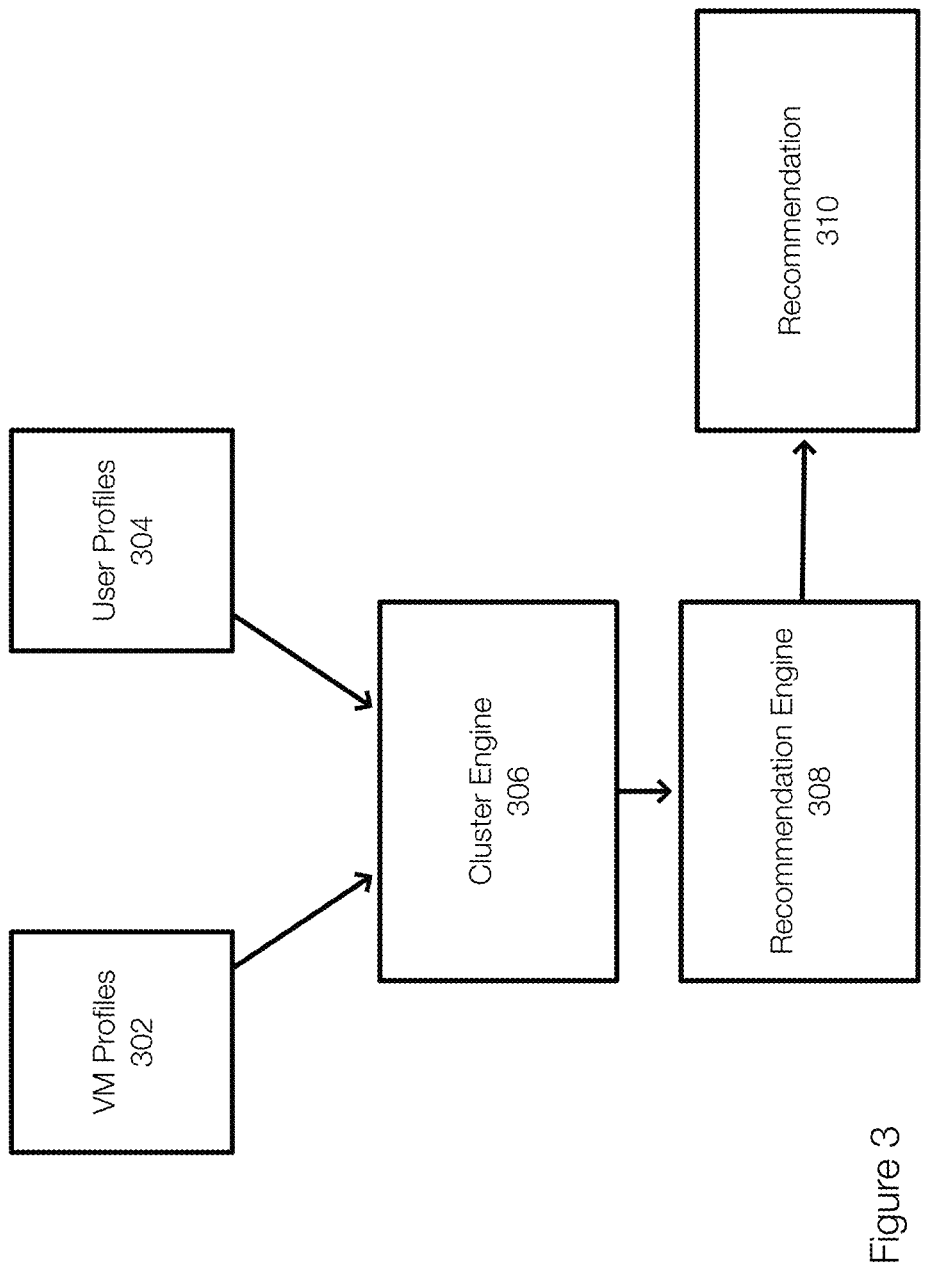
FIG. 3 illustrates an example of systems and methods for generating policy recommendations.

FIG. 3 illustrates an example of a recommendation server that may implement various techniques such as machine learning and/or clustering to generate recommendations. Initially, embodiments of the invention may create VM profiles 302 and user profiles 304. The virtual machine profiles 302 may include a profile for each VM of each customer. As a result, there may be thousands of VM profiles 302 that are generated and that are based on the definition of the VM profile.

The VM profiles 302 are defined by a set of features that may be used in machine learning or for other purposes. The VM profiles 302 may include features from VM usage such as statistics on CPU usage (e.g., on a time basis such as weekly), usage peak hours, list of running applications, applications most used, operating system, space, number of CPUs, and the like or combination thereof. Additional features may include a group relative size (e.g., number of VMs in group divided by the total number of customer VMs), relative creation date, and the like.

The user profiles 304 may also specify features such as, but not limited to, number of VMs, number of data protection systems, number of site locations, user domain (e.g., banking, medical), or the like or combination thereof. The VM profiles 302 may each have up to n features and the user profiles 304 may each have up to m features.

The features for both the VM profiles 302 and the user profiles 304 may include usage. For the VM profiles 302, usage may refer by way of example only, to tracking performance indicators such as CPU or memory. For the user profiles 304, usage may refer to usage of the user. This may include how the user interacts with the system, what actions are performed by the user, which applications are accessed and used, and the like.

A cluster engine 306 may receive the VM profiles 302 and the user profiles 304 as input. In one example, the user profiles 304, which each correspond to a customer or organization in one example, can be clustered by the cluster engine 306. Each customer may be represented as a point in a n dimensional space and a methodology such as k-mean may be applied to cluster the users or customers. The parameter k may represent the number of clusters. An optimal value of k can be determined by direct or statistical testing methods. In one example, the cluster engine 306 implements unsupervised learning and may discover natural groupings or clusters in the input, which may include the VM profiles 302 and the user profiles 304.

Figure 4:
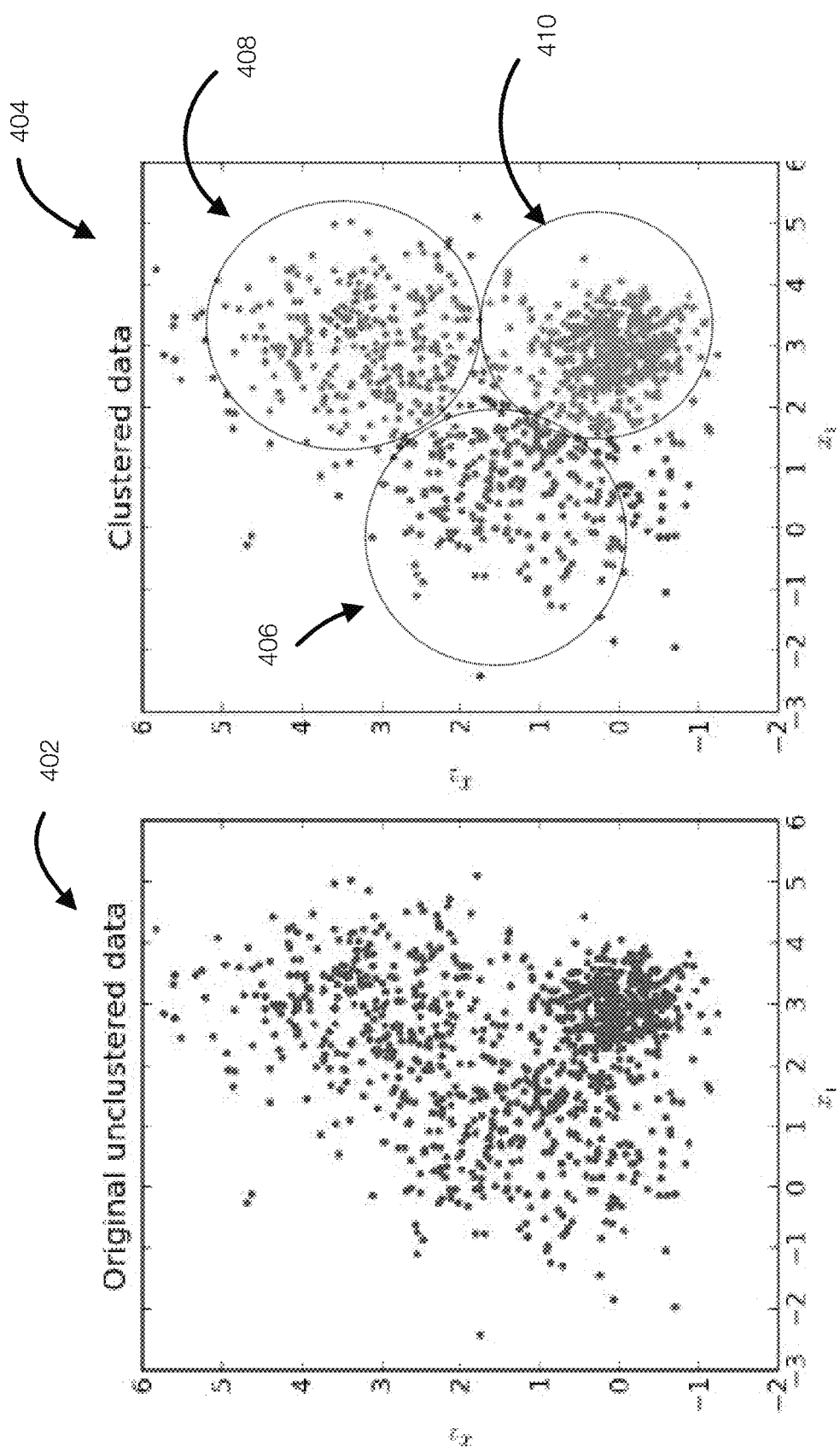
FIG. 4 illustrates an example of clustered data in accordance with embodiments of the invention.

FIG. 4 illustrates an example of clustering by user profile or on a customer basis. Thus, the customers can be clustered based on the features in the user profiles. FIG. 4 includes a graph 402 of unclustered data and a graph 404 of clustered data. In this example, k is 3 and the cluster engine has identified clusters 406, 408, and 410. The virtual machines can be clustered in a similar manner. Thus, FIG. 4 may also represent clustering by virtual machine profile or by the features in the virtual machine profiles.

In another example, the clustering may be hierarchical, layered, cascaded or based on an order. For example, the cluster engine may cluster based on the user profiles 304. The results of the cluster engine may then be clustered based on the VM profiles 302. The output of the cluster engine includes clusters that have been clustered by both the user profiles and the VM profiles.

Each of the clusters 406, 408, and 410 may include or represent a very large number of virtual machines from multiple users or customers. Once the clustering has been performed, the recommendation engine 308 may process the clusters to generate a distribution. In one example, the distribution may be a policy distribution. A distribution and a continuous representation of the replication policies can be determined for each cluster.

More specifically, because the clusters shown in the graph 404 represent a distribution of virtual machines and because each virtual machine is associated with a data protection policy such as a replication policy, a distribution of the replication policies can be generated. A replication policy, for example, may specify how data is replicated. The policy may specify to replicate after X MBs are generated, whether the replication is synchronous or asynchronous, the replication site or sites, or the like.

Figure 5:
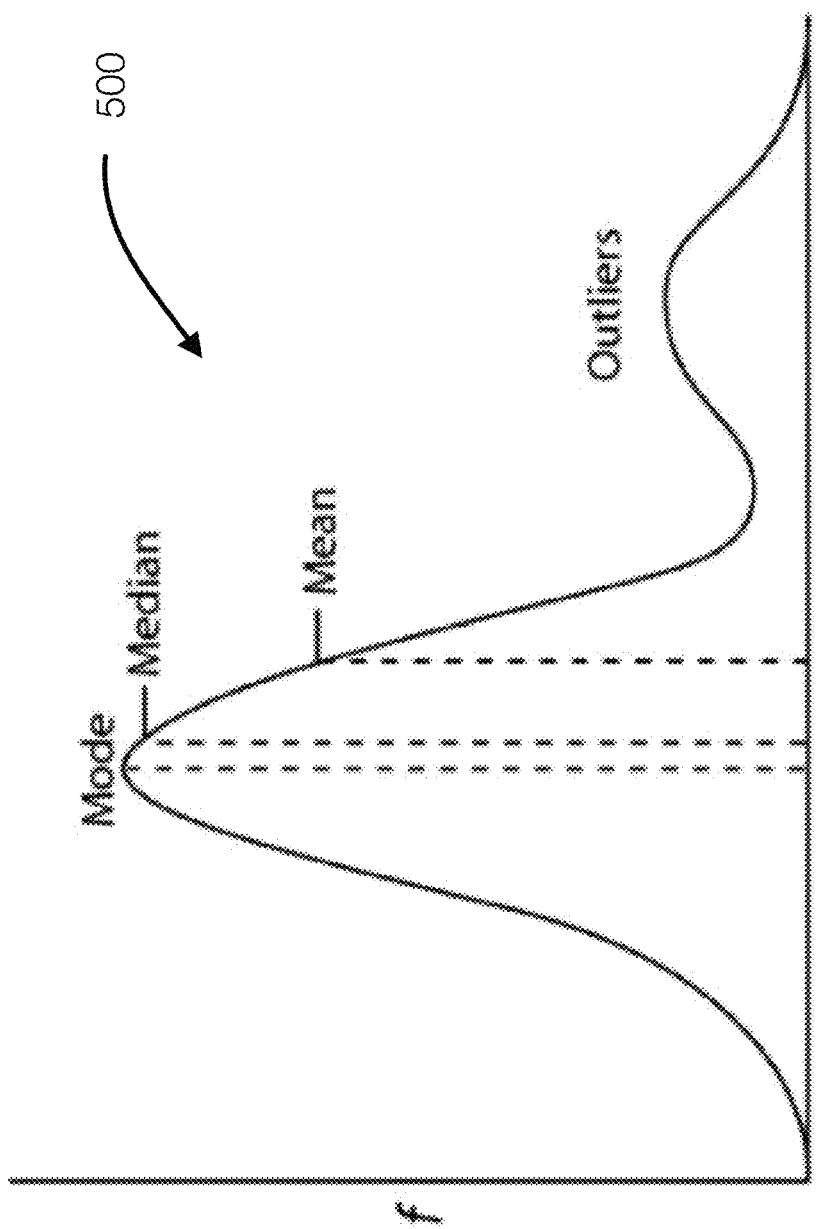
FIG. 5 illustrates an example of a policy distribution for a cluster.

FIG. 5 illustrates an example of a policy distribution of a cluster. This allows, by way of example, mode, median, mean, and outliers to be identified by the recommendation engine 308. To generate the distribution 500, a statistical analysis can be applied to each cluster in order to find the distribution.

Once the distribution is determined, virtual machines that may have an unexpected replication policy may be detected. Outliers can be identified (e.g., outliers are a certain number of standard deviations away from the mean). Outliers can be determined in different manners as well. The recommendation engine may identify the most common replication policy and generate a recommendation 310 (e.g., to an outlier) that the user may consider changing to the recommended replication policy 310.

More generally, embodiments of the invention are able to identify specific groups of VMs that may benefit by changing their associated data protection policy. As shown in FIG. 3, the recommendation 310 can be made automatically and proactively. The impact of accepting the recommended policy can also be calculated and the user would be informed in advance in one example.

Figure 6:
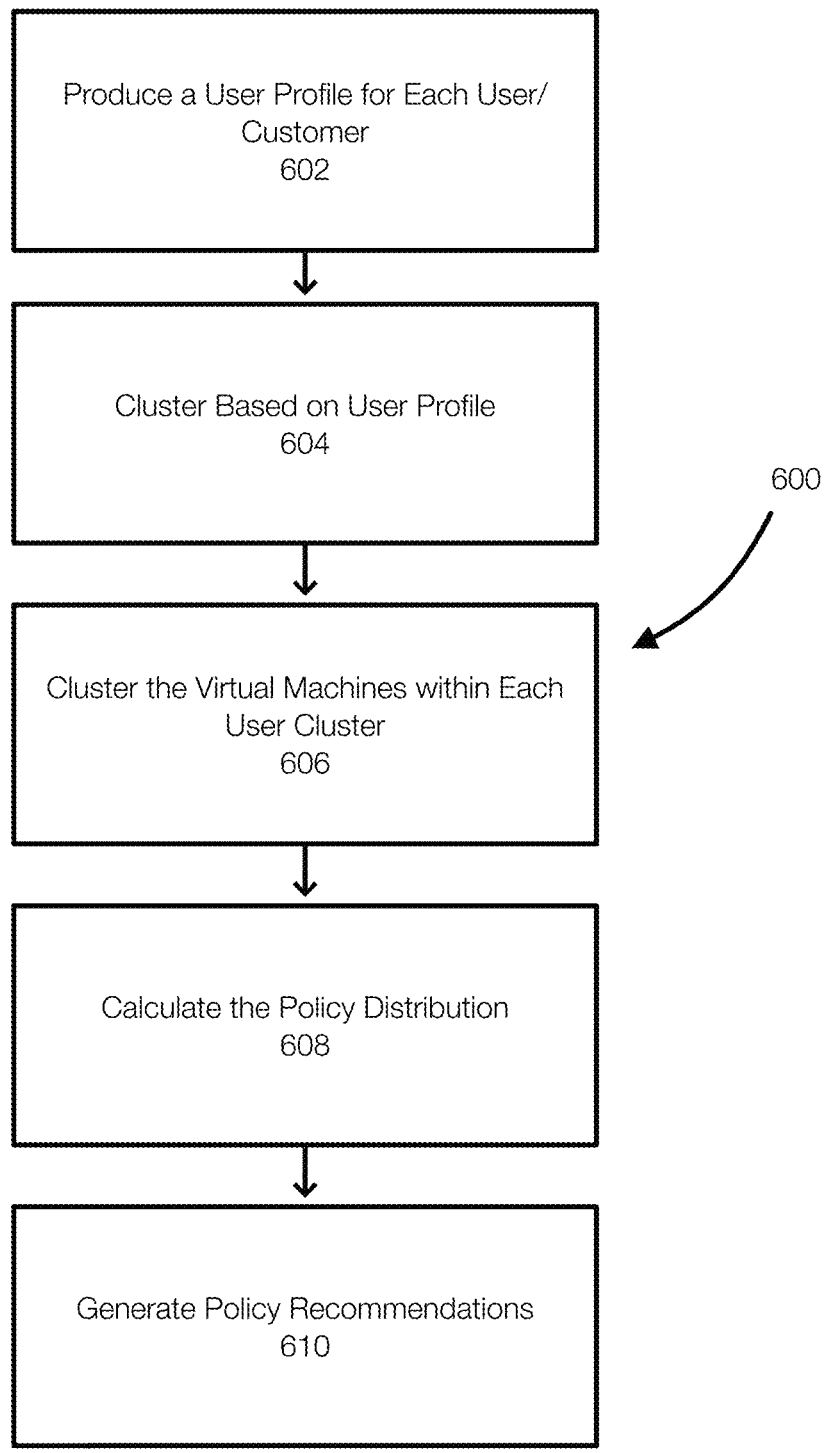
FIG. 6 discloses aspects of a method for generating policy recommendations.

FIG. 6 illustrates an example of a method for generating a recommended data protection policy. Stated differently, embodiments of the invention may detect policies that are not optimal or that not right for the needs of a user based in part on the replication policies used by other similar users. Embodiments of the invention may identify that a policy change is needed before the user is aware of the need for a policy change.

The method 600 may begin, assuming that the user profile and virtual machine profiles have been created/defined, by producing 602 a user profile for each user/customer based on the corresponding profile. This may include collecting information for each of the features identified in the user profile definition. This information may be collected or received from multiple control centers. The information corresponding to the features of the user profile can be collected over time, continually or repeated updated over time, or the like. By continually updating the profiles, embodiments of the invention can identify trends in data protection policies as well as identify outliers. This allows recommendations to be provided to any of the users based on where they are in the distribution or cluster. Typically, each user profile corresponds to a user or a specific customer, even where a single customer may have multiple installations or instances of a data protection system. For customers or users that have multiple installations, a recommendation may be generated for each installation at least because the circumstances at one installation may differ from the circumstances at another installation.

Clustering based on the user profile results in clusters. Each cluster is then clustered 606 based on the VM profile. This results in the clusters from which the policy distributions are determined. This is also an example of cascaded clustering where the results of one clustering process are used as the inputs to a second clustering process.

Once the clusters have been determined, a distribution of the policies associated with those virtual machines is determined 608 or calculated. The distribution allows, for example, virtual machines with policies deemed to be suboptimal or as outliers to be identified. Policy recommendations can be generated 610 for those users associated with the virtual machines that are outliers. Because this process may be executed as the features in the profiles change, the recommendations may reflect trends and the like. For example, a cluster associated with a banking domain or industry may be subject to various regulations. When most banks update their policies in response to a change in regulations, the banks that did not update their policies may receive a recommendation as they become outliers.

In one example, each virtual machine may be associated with a data protection policy such as a replication policy. As previously stated, embodiments of the invention generate automated and proactive recommendations for VM replication (or recommendations for other data protection operations). By processing usage data generated by a user or customer without human intervention provides an objective view on the usage and the needs of the customers.

One benefit of the user profile is the ability to determine which customers are similar. By establishing a relationship between the customers (e.g., by clustering based on the user profiles), their corresponding usage can be analyzed in a relative way such that the conclusions drawn from the data can be applied or recommended to other similar customers.

The data driven recommendations discussed herein allow users to understand when a change in their replication policy is needed. This may apply to virtual machines individually, in groups, or as a whole. Even if a user can eventually determine that the replication policy of a VM needs to be changed, there user may be exposed to data loss. This may be due to lack of domain experience, human mistake or unawareness of regulatory rules. Embodiments of the invention are proactive and inform customers that their current replication policies may not satisfy their needs.

Further, embodiments of the invention often recommend policies that have already been tested and implemented by other customers—which is reflected in the distribution. More specifically, because the distribution is based on many users, the recommendations are based on policies that are used by a sufficient number of users.

At least some embodiments of the invention provide for the implementation of the disclosed functionality in existing backup platforms, examples of which include Dell RecoverPoint. In general however, the scope of the invention is not limited to any particular data protection platform or data storage environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients or agents (e.g., components of a data protection system) that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'backup' is intended to be broad in scope. As such, example backups in connection with which embodiments of the invention may be employed include, but are not limited to, full backups, partial backups, clones, snapshots, and incremental or differential backups. Further, backups or replicated data may be configured such that any PiT may be recovered therefrom, such that failover may occur, or such that other disaster recovery or continuity operations may be performed.

Following are some further example embodiments of the invention. These are presented only by way of example and are not intended to limit the scope of the invention in any way.

Embodiment 1. A method, comprising: producing a user profile for each user of a data protection system and producing a virtual machine profile for each virtual machine of each user, clustering the users based on the user profiles of the users to generate first clusters, each of the first clusters associated with a plurality of virtual machines, within each of the first clusters, clustering the virtual machines based on the virtual machine profiles to produce second clusters, determining a policy distribution for each of the second clusters, and generating recommendation policies for at least some of the users based on the policy distribution.

Embodiment 2. The method of embodiment 1, further comprising creating the user profile, the user profile including n features.

Embodiment 3. The method of embodiment 1 and/or 2, further comprising creating the virtual machine profile, the virtual machine profile defining m features.

Embodiment 4. The method of embodiment 1, 2, and/or 3, further comprising determining which of the virtual machines are associated with policies that are outliers based on the policy distribution.

Embodiment 5. The method of embodiment 1, 2, 3, and/or 4, further comprising recommending a most common policy to users associated with the outliers based on the policy distribution.

Embodiment 6. The method of embodiment 1, 2, 3, 4, and/or 5, further comprising generating the recommendation policies proactively without a request from the users.

Embodiment 7. The method of embodiment 1, 2, 3, 4, 5, and/or 6, wherein the user profiles include features associated with the users including one or more of company sector, size, location, amount of protected virtual machines, number of data protection systems, user domain, and usage, and wherein the virtual machine profiles include features including one or more of operating system, space, number of processors, memory, group relative size, relative creation date.

Embodiment 8. The method of embodiment 1, 2, 3, 4, 5, 6, and/or 7, further comprising generating the recommendation based on use of the recommendation by other users.

Embodiment 9. The method of embodiment 1, 2, 3, 4, 5, 6, 7, and/or 8, further comprising assigning a policy to a new user based on a user profile of the new user and a cluster to which the new user is assigned.

Embodiment 10. The method of embodiment 1, 2, 3, 4, 5, 6, 7, 8, and/or 9, wherein the users are different users and wherein each of the users has at least one data protection policy at one production site.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment including virtualized environments and containerized environments.

Figure 7:
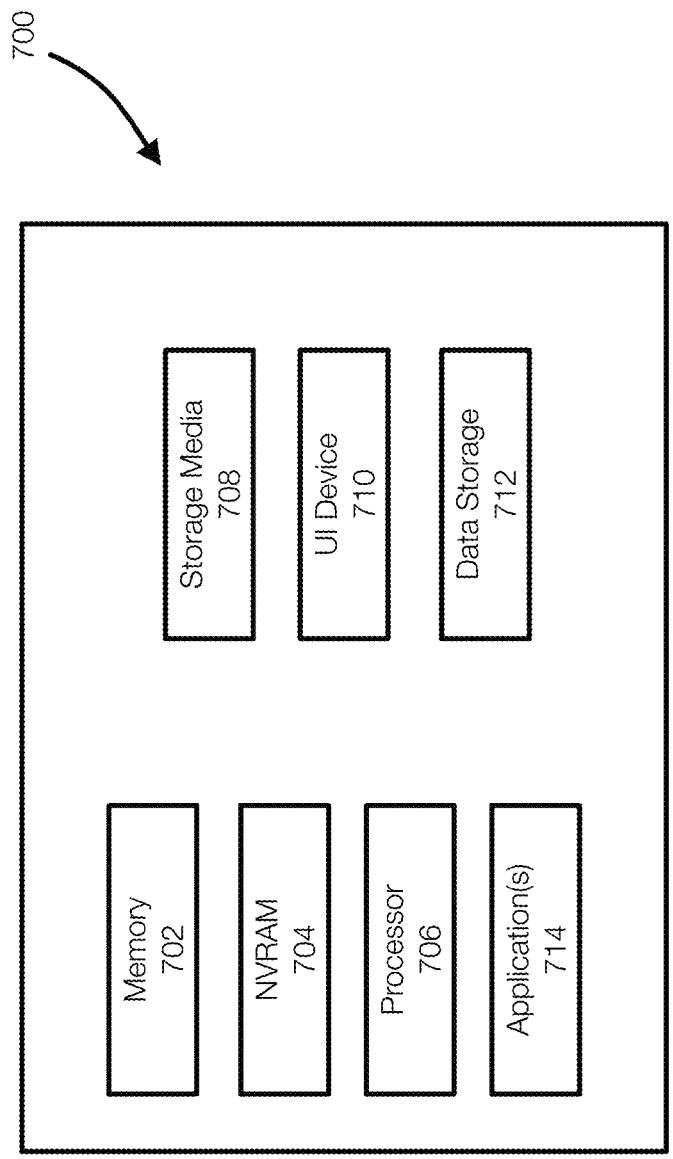
FIG. 7 discloses aspects of a computing device.

With reference briefly now to FIG. 7, any one or more of the entities disclosed, or implied, by the disclosure, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
producing a user profile for each user of a data protection system and producing a virtual machine profile for each virtual machine of each user;

clustering the users based on the user profiles of the users to generate first clusters, each of the first clusters associated with a plurality of virtual machines;

within each of the first clusters, clustering the virtual machines based on the virtual machine profiles to produce second clusters;

determining a policy distribution for each of the second clusters; and generating recommendation policies for at least some of the users based on the policy distribution.

2. The method of claim 1, further comprising creating the user profile, the user profile including n features.

3. The method of claim 2, further comprising creating the virtual machine profile, the virtual machine profile defining m features.

4. The method of claim 1, further comprising determining which of the virtual machines are associated with policies that are outliers based on the policy distribution.

5. The method of claim 4, further comprising recommending a most common policy to users associated with the outliers based on the policy distribution.

6. The method of claim 5, further comprising generating the recommendation policies proactively without a request from the users.

7. The method of claim 6,
wherein the user profiles include features associated with the users including one or more of company sector, size, location, amount of protected virtual machines, number of data protection systems, user domain, and usage, and wherein the virtual machine profiles include features including one or more of operating system, space, number of processors, memory, group relative size, relative creation date, and usage.

8. The method of claim 1, further comprising generating the recommendation based on use of the recommendation by other users.

9. The method of claim 1, further comprising assigning a policy to a new user based on a user profile of the new user and a cluster to which the new user is assigned.

10. The method of claim 1, wherein the users are different users and wherein each of the users has at least one data protection policy at one production site.

11. A non-transitory storage medium having stored therein instructions that are executable by one or more hardware processors to perform operations comprising:

producing a user profile for each user of a data protection system and producing a virtual machine profile for each virtual machine of each user;

clustering the users based on the user profiles of the users to generate first clusters, each of the first clusters associated with a plurality of virtual machines;

within each of the first clusters, clustering the virtual machines based on the virtual machine profiles to produce second clusters;

determining a policy distribution for each of the second clusters; and generating recommendation policies for at least some of the users based on the policy distribution.

12. The non-transitory storage medium of claim 11, further comprising creating the user profile, the user profile including n features.

13. The non-transitory storage medium of claim 12, further comprising creating the virtual machine profile, the virtual machine profile defining m features.

14. The non-transitory storage medium of claim 11, further comprising determining which of the virtual machines are associated with policies that are outliers based on the policy distribution.

15. The non-transitory storage medium of claim 14, further comprising recommending a most common policy to users associated with the outliers based on the policy distribution.

16. The non-transitory storage medium of claim 15, further comprising generating the recommendation policies proactively without a request from the users.

17. The non-transitory storage medium of claim 16,
wherein the user profiles include features associated with the users including one or more of company sector, size, location, amount of protected virtual machines, number of data protection systems, user domain, and usage, and wherein the virtual machine profiles include features including one or more of operating system, space, number of processors, memory, group relative size, relative creation date, and usage.

18. The non-transitory storage medium of claim 11, further comprising generating the recommendation based on use of the recommendation by other users.

19. The non-transitory storage medium of claim 11, further comprising assigning a policy to a new user based on a user profile of the new user and a cluster to which the new user is assigned.

20. The non-transitory storage medium of claim 11, wherein the users are different users and wherein each of the users has at least one data protection policy at one production site.

* * * * *